United States Patent
Benakli et al.

(10) Patent No.: US 7,732,069 B1
(45) Date of Patent: *Jun. 8, 2010

(54) THIN SUL MEDIA WITH SHIELDED POLE HEAD

(75) Inventors: Mourad Benakli, Shrewbury, MA (US); Michael Mallary, Sterling, MA (US); Adam Torabi, Shrewbury, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 1018 days.

This patent is subject to a terminal disclaimer.

(21) Appl. No.: 11/148,942

(22) Filed: Jun. 9, 2005

Related U.S. Application Data (60) Provisional application No. 60/578,788, filed on Jun. 10, 2004, provisional application No. 60/642,412, filed on Jan. 7, 2005.

(51) Int. Cl.
   *G11B 5/64* (2006.01)
(52) U.S. Cl. .................. 428/826; 428/827; 428/832; 428/832.1; 360/327.11
(58) Field of Classification Search .............. None
   See application file for complete search history.

(56) References Cited

U.S. PATENT DOCUMENTS

| | | | |
|---|---|---|---|
| RE33,949 E | 6/1992 | Mallary et al. | 360/110 |
| 6,890,667 B1 | 5/2005 | Lairson et al. | 428/611 |
| 6,906,894 B2 * | 6/2005 | Chen et al. | 360/125.12 |
| 2002/0028357 A1 * | 3/2002 | Shukh et al. | 428/694 TM |
| 2002/0160230 A1 * | 10/2002 | Yoshikawa et al. | 428/694 T |
| 2005/0249984 A1 * | 11/2005 | Ohmori et al. | 428/846.1 |

FOREIGN PATENT DOCUMENTS

| | | |
|---|---|---|
| JP | 07-169037 | 4/1995 |
| JP | 10-116412 | 6/1998 |
| JP | 2000-222715 | 11/2000 |

OTHER PUBLICATIONS

Schabes et al., "Micromagnetic Modeling of Soft Underlayer Magnetization Processes and Fields in Perpendicular Magnetic Recording", *IEEE Transactions on Magnetics*, vol. 38, No. 4, Jul. 2002.

Abarra, et al., "Preconditioning, Write, Width, and Recording Properties of Co-Cr-Pt-O Perpendicular Media with Various Underlayer Designs", *IEEE Transactions on Magnetics*, vol. 41, No. 2, Feb. 2005.

* cited by examiner

*Primary Examiner*—Mark Ruthkosky
*Assistant Examiner*—Gary Harris
(74) *Attorney, Agent, or Firm*—Kinney & Lange, P.A.

(57) ABSTRACT

A disk drive system having a shielded pole write head and media that includes a disk having a soft underlayer (SUL) that is relatively thin in order to save on cost for producing the SUL. The SUL is thin enough that it will become magnetically saturated in the vicinity of the write pole. The thickness of the SUL that will achieve this saturation may be stated as being less than a geometric factor times the ratio of the write pole saturation magnetization divided by the saturation magnetization of the SUL. The geometric factor is the ratio of the write pole area at the ABS to the write pole perimeter at the ABS.

17 Claims, 6 Drawing Sheets

FIG. 3. Schematic perpendicular SUL media and a MP writer (a) with a pancake coil and SP writer (b) with a double pancake coil in which the current directions are opposite.

FIG. 4. Deep saturation nonlinear FEM magnetization map for a SP writer.

FIG. 5. MP effective field vs down track position for SUL thicknesses of 40 and 160 nm.

FIG. 6. SP effective field vs down track position for SUL thickness of 40 and 160 nm.

FIG. 7. Peak effective field of MP and SP heads vs SUL thickness

FIG. 8. Calculated effective-field gradient for a MP and a SP head at the point where the effective field is 80% of the maximum for a MP head and a SP head vs SUL thickness.

FIG. 9. Calculated MWW vs SUL thickness for MP and SP heads.

FIG. 10. Measured SNR (a), MWW (b), and OVW (c), vs SUL thickness for SP heads.

THIN SUL MEDIA WITH SHIELDED POLE HEAD

CROSS-REFERENCE TO RELATED APPLICATIONS

This application claims priority from U.S. Provisional Patent Application No. 60/578,788, filed Jun. 10, 2004, entitled "Thin Soft Underlayer Media with Shielded Pole Head" and U.S. Provisional Patent Application No. 60/642,412, filed Jan. 7, 2005, entitled "Thin Soft Underlayer Media with Shielded Pole Head", the contents of each of which are incorporated herein by reference.

BACKGROUND

In hard disk drives, data is written to and read from magnetic recording media, herein called disks. Typically, one or more disks having a thin film of magnetic material coated thereon are rotatably mounted on a spindle. A read/write head mounted on an actuator arm is positioned in close proximity to the disk surface to write data to and read data from the disk surface.

During operation of the disk drive, the actuator arm moves the read/write head to the desired radial position on the surface of the rotating disk where the read/write head electromagnetically writes data to the disk and senses magnetic field signal changes to read data from the disk. Usually, the read/write head is integrally mounted in a carrier or support referred to as a slider. The slider generally serves to mechanically support the read/write head and any electrical connections between the read/write head and the disk drive. The slider is aerodynamically shaped, which allows it to fly over and maintain a uniform distance from the surface of the rotating disk.

Typically, the read/write head includes a magnetoresistive read element to read recorded data from the disk and an inductive write element to write the data to the disk. The read element includes a thin layer of a magnetoresistive sensor stripe sandwiched between two magnetic shields that may be electrically connected together but are otherwise isolated. A current is passed through the sensor stripe, and the resistance of the magnetoresistive stripe varies in response to a previously recorded magnetic pattern on the disk. In this way, a corresponding varying voltage is detected across the sensor stripe. The magnetic shields help the sensor stripe to focus on a narrow region of the magnetic medium, hence improving the spatial resolution of the read head.

The write element typically includes a coil of wire through which current is passed to create a magnetic field that can be directed toward an adjacent portion of the disk by a ferromagnetic member known as a write pole. While it is known that the write element can be arranged to either store data longitudinally or perpendicularly on the disk, most, if not all, commercial disk drives to date have utilized longitudinal recording arrangements. Although perpendicular recording techniques have the potential to allow for higher densities of recorded information, longitudinal recording is used in all current products for historical reasons. An early perpendicular recording technique is disclosed in U.S. Pat. No. RE 33,949, the contents of which are incorporated herein by reference.

The '949 patent discloses a perpendicular or vertical write head with a write pole section, downstream shield section, and a pancake coil surrounding the write pole section to generate magnetic flux therein. The shield section is disclosed to have a surface facing toward the media that is many times larger than a similarly-oriented face of the write pole. The media is disclosed to include two layers, an upper layer closer to the head having perpendicular uniaxial anisotropy and a lower layer having low magnetic reluctance (now known as the Soft Under Layer (SUL)). A high write field can then be produced between the write pole and the SUL to record information in the upper layer of the media. The write flux returns through the SUL to the downstream write shield.

As perpendicular recording techniques have become more popular, it has been determined that producing media with a soft underlayer (SUL) is more expensive than producing the standard disks used as media in longitudinal recording systems. For example, it is estimated that each disk produced with an SUL costs $1.00 more to produce than disks without an SUL. Despite this cost disadvantage, it has generally been believed in the disk drive community that the SUL had to be made thick enough to prevent saturation of the magnetic field therein. Schabes et al. "Micromagnetic Modeling of Soft Underlayer Magnetization Processes and Fields in Perpendicular Magnetic Recording", *IEEE Transactions on Magnetics*, Volume 38, No. 4, July 2002. This paper highlights the need for thicker SULs for monopole heads, and it has generally been assumed to be also true for other head arrangements. It was believed that avoiding saturation in the region of the SUL around the perimeter of the write pole was necessary to get sufficient write fields.

In order to maintain a sufficiently thick SUL to avoid saturation yet reduce the cost, some have attempted to plate a large portion of the SUL instead of applying it by sputtering (see U.S. Pat. No. 6,890,667). In this case, electroless nickel was plated and then polished, and made magnetic rather than non-magnetic, as opposed to the typical non-magnetic electroless nickel The plated SUL may then have a thin layer of a more conventionally applied SUL applied on top thereof.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

One aspect relates to a magnetic recording disk for a disk drive system having a read/write head, the read/write head including a write pole and a downstream write shield, the write pole having a magnetization saturation and the write pole having an air bearing surface facing toward the disk that has an area and a perimeter. The disk includes a recording layer for recording data and a soft underlayer (SUL) disposed on an opposite side of the recording layer from the read/write head. The SUL is operative to return magnetic flux to the read/write head. The SUL has a thickness that is approximately equal to or less than a geometric factor times the ratio of the write pole magnetization saturation divided by the saturation magnetization of the SUL, the geometric factor being the ratio of the write pole area at the air bearing surface to the perimeter of the write pole at the write pole perimeter.

The distance from the write pole tip to the downstream shield may be between half and twice the distance from the write pole to the SUL. The recording layer may record data perpendicularly. The recording layer may have perpendicular anisotropy. The recording layer may record data longitudinally. The SUL may have a thickness of less than 120 nanometers. The SUL may have a thickness between 50 and 120 nanometers. The disk may further include a substrate onto which the SUL is placed.

Another aspect relates to a disk drive system including a read/write head with a write transducer including a write pole and a downstream write shield, the write pole having a magnetization saturation and the write pole having an air bearing surface facing toward the disk that has an area and a perimeter. The system also includes a magnetic recording disk having a recording layer for recording data and a soft underlayer (SUL) disposed on an opposite side of the recording layer from the read/write head. The SUL is operative to return magnetic flux to the read/write head. The SUL has a thickness that is approximately equal to or less than a geometric factor times the ratio of the write pole magnetization saturation divided by the saturation magnetization of the SUL, the geometric factor being the ratio of the write pole area at the air bearing surface to the perimeter of the write pole at the write pole perimeter.

Another aspect relates to a magnetic recording disk for a disk drive system having a read/write head, the read/write head including a write pole and a downstream write shield, the write pole having a magnetization saturation and the write pole having an air bearing surface facing toward the disk that has an area and a perimeter. The disk includes a recording layer for recording data and a soft underlayer (SUL) disposed on an opposite side of the recording layer from the read/write head. The SUL is operative to return magnetic flux to the read/write head. The SUL has a thickness that is sufficiently small in magnitude to achieve magnetic saturation of the SUL in the vicinity of the SUL closest to the write pole.

Another aspect relates to a disk drive system, including a read/write head with a write transducer including a write pole and a downstream write shield, the write pole having a magnetization saturation and the write pole having an air bearing surface facing toward the disk that has an area and a perimeter. The system also includes a magnetic recording disk having a recording layer for recording data and a soft underlayer (SUL) disposed on an opposite side of the recording layer from the read/write head. The SUL is operative to return magnetic flux to the read/write head. The SUL has a thickness that is sufficiently small in magnitude to achieve magnetic saturation of the SUL in the vicinity of the SUL closest to the write pole.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein be considered illustrative rather than limiting.

DETAILED DESCRIPTION

Reference will now be made to the accompanying drawings, which assist in illustrating the various pertinent features of the present invention. Although the present invention will now be described primarily in conjunction with disk drives, it should be expressly understood that the present invention may be applicable to other applications where magnetic recording of data is required/desired. In this regard, the following description of a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application(s) or use(s) of the present invention.

Figure 1:
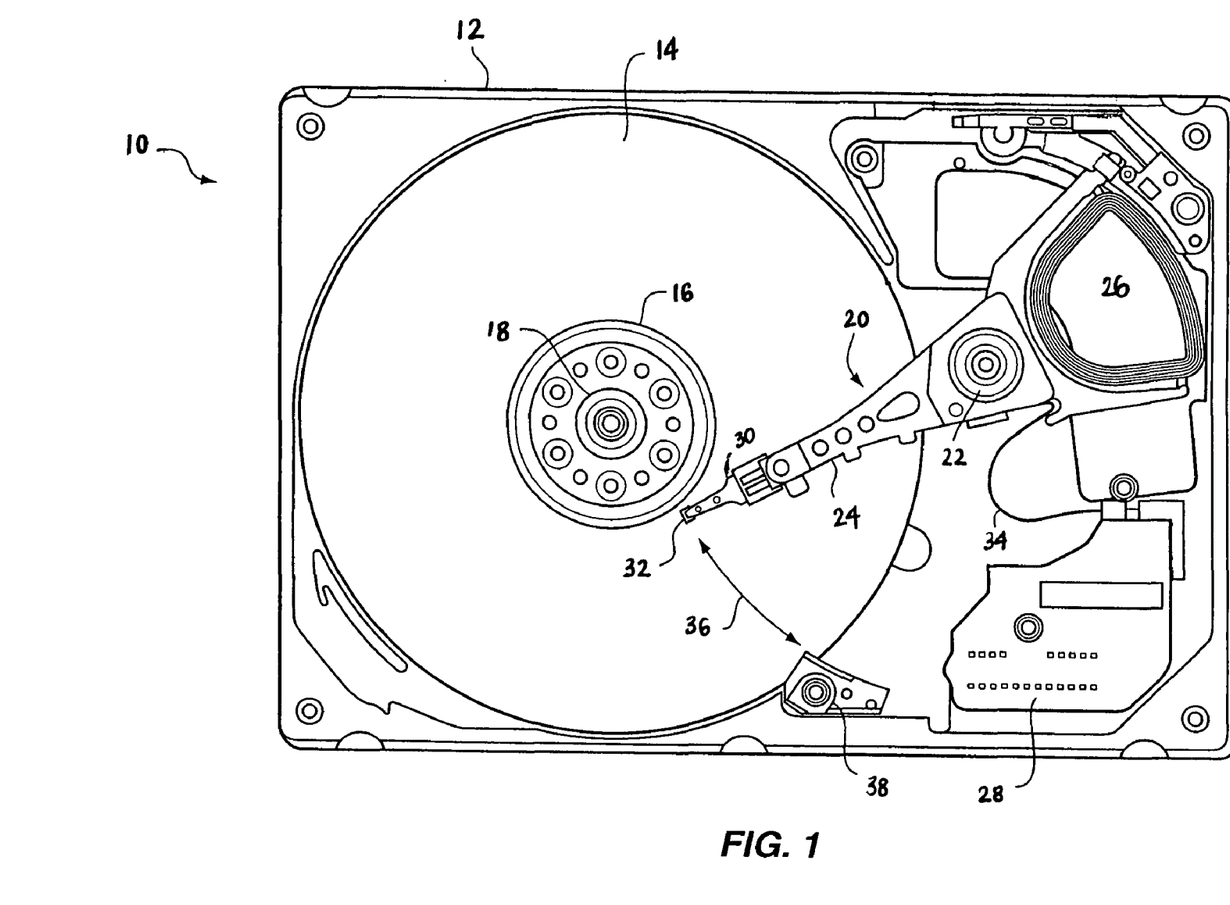
FIG. 1 is a top view of a disk drive system in which the thin SUL media is included.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations. The head on the slider 32 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance ($\Delta R/R$) of 2-4%. GMR results from spin-dependent scattering mechanisms between two (or more) magnetic layers. The typical use in recording heads is the spin valve device that uses a pinned magnetic layer and a free layer to detect external fields. The normalized change in resistance is typically 8-12%, but can be as large as 15-20% when used with specular capping layers and spin-filter layers. TuMR is similar to GMR, but is due to spin dependent tunneling currents across an isolation layer. The typical embodiment includes a free layer and a pinned layer separated by a insulating layer of $Al_2O_3$ with the current flowing perpendicular to the film plane, producing normalized change in resistance of 12-25%. The term magnetoresistive is used in this application to refer to all these types of magnetoresistive sensors and any others in which a variation in resistance of the sensor due to the application of an external magnetic field is detected. The write transducer technology of the head of the present invention is discussed in further detail below.

The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or "landing" on its corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

It has been discovered for perpendicular recording that, even though the data is being recorded perpendicularly (or vertically) in the media rather than longitudinally, some amount of longitudinal field helps to switch the grains of magnetic material in the media from one vertical orientation to the opposite vertical orientation (e.g., from up to down). In other words, it has been discovered that rather than merely exposing the upwardly-directed magnetic orientation of a grain to a downward magnetic field to reverse the direction of the magnetic orientation, the grain is more easily reversed if there is also a transverse or horizontal component to the magnetic field (referred to herein as a longitudinal field). The total magnetic field can be seen to be:

$$H_{TOTAL} = ((H_X)^2 + (H_Z)^2)^{1/2} \quad (1)$$

where $H_X$ is the down track longitudinal field component and $H_Z$ is the perpendicular field component (perpendicular to the media). A measure of the switchability of the magnetic orientation has been developed. It is referred to as the Stoner-Wolfarth switching field:

$$H_{SW} = ((H_X)^{2/3} + (H_Z)^{2/3})^{3/2} \quad (2)$$

Equation (2) summarizes the benefit of the longitudinal field in switching the magnetic orientation of the grain. If $H_K$ is the minimum vertical magnetic field that will switch the magnetic orientation, then $H_{SW}$ is always less than or equal to $H_K$. In fact, if equal vertical and longitudinal fields are applied to the grain, then $H_{SW}$ is equal to one-half of $H_K$.

Figure 2:
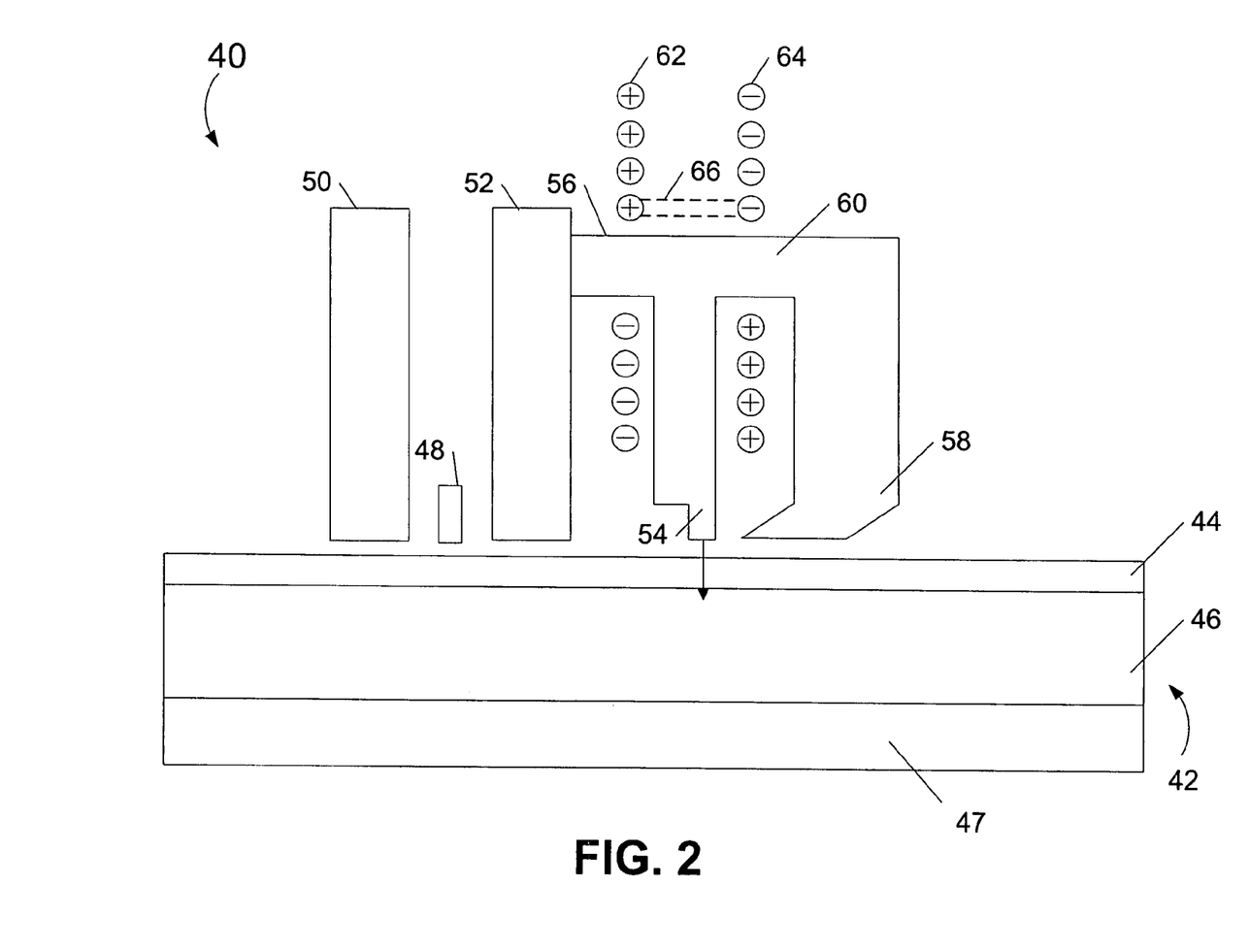
FIG. 2 is a side view of a simplified representation of a read/write head adjacent a disk with a thin SUL.

FIG. 2 shows a read/write head 40 with a shielded write pole. As can be seen, the head 40 is shown adjacent to a media layer 42 that includes an upper layer 44 for recording data, a lower SUL layer 46 below the upper layer 44, and a non-magnetic substrate 47 on an opposite side of the SUL 46 from the media layer 42. The head 40 includes a GMR read element 48 sandwiched between a first and second read shield 50 and 52. A write pole 54 is connected to the second read shield 52 by a magnetic via 56. A magnetic shield 58 is connected to the write pole 54 via a second magnetic via 60. The head 40 also includes two sets of pancake write coils 62 and 64. The first pancake write coil 62 surrounds the first magnetic via 56 while the second pancake write coil 64 surrounds the second magnetic via 60. The write coils 62 and 64 are coiled in the same direction and connected at the central electrical via 66 so that current flowing in one direction in one coil is flowing in the opposite direction in the other coil. The second pancake write coil 64 is primarily responsible for causing the write field induced by the write pole 54 into the media layer 42. The first pancake write coil 62 is provided as a bucking coil to attempt to cancel the external field caused by the first coil 64. This minimizes unintended flux coupling from the write shield 58 to the read shields 50 and 52. The amp-turns on the two coils 62 and 64 may be balanced so that little net field appears under the shields 50, 52, and 58, or they may not be balanced.

Figure 3:
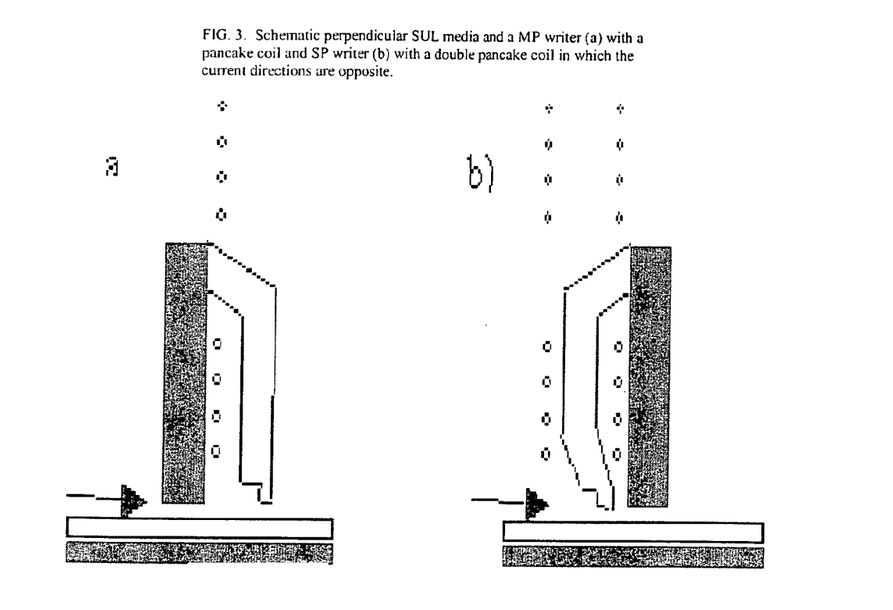
FIGS. 3a and 3b are schematic views of a monopole writer and a shielded pole writer, respectively.

The thickness of the SUL in perpendicular media is a critical parameter in the write performance of the system and in the production cost of the media. Therefore, it is important to target the SUL thickness to the minimum required value in order to balance performance and economics. When a monopole (MP) writer is used (FIG. 3(a)), the minimum thickness has typically been of the order of 200 nm or greater in order to avoid developing a saturation zone around the periphery of the write pole. It is shown below that saturation of the SUL with a MP writer results in the reduction of the write field strength and gradient. For a rectangular writer pole shape, this minimum thickness can be approximately calculated by:

$$T = WL(M_{sPOLE}/M_{sSUL})/2(W+L), \quad (3)$$

where $M_{sPOLE}$ and $M_{sSUL}$ are the saturation magnetizations of the MP pole and the SUL, respectively, W is the MP width, and L is its down track length. Equation (3) includes only the write flux that is transferred to the SUL directly under the MP when the MP is driven to saturation. A more accurate nonlinear magnetic finite element (FEM) calculation that includes the contribution of fringing flux would call for an even greater thickness. The Schabes paper referenced in the Background section provides a comprehensive micromagnetic analysis of SUL thickness for a MP writer.

It is shown below that when a shielded pole (SP) writer (see FIGS. 2 and 3(b)) is used, the thickness of the SUL can be greatly reduced below the value given by Eq. (3) while the effective write field and effective write field gradient actually improve even though the SUL is driven deeply into saturation. In addition, the calculated magnetic write width (MWW) is reduced significantly below that which would result from the use of a MP on a thick SUL with an equivalent write field strength in the recording zone. Therefore, the SP writer not only has a signal to noise advantage due to its higher write field gradient as predicted and experimentally confirmed, but it also requires less expensive media that results in reduced MWW.

Figure 4:
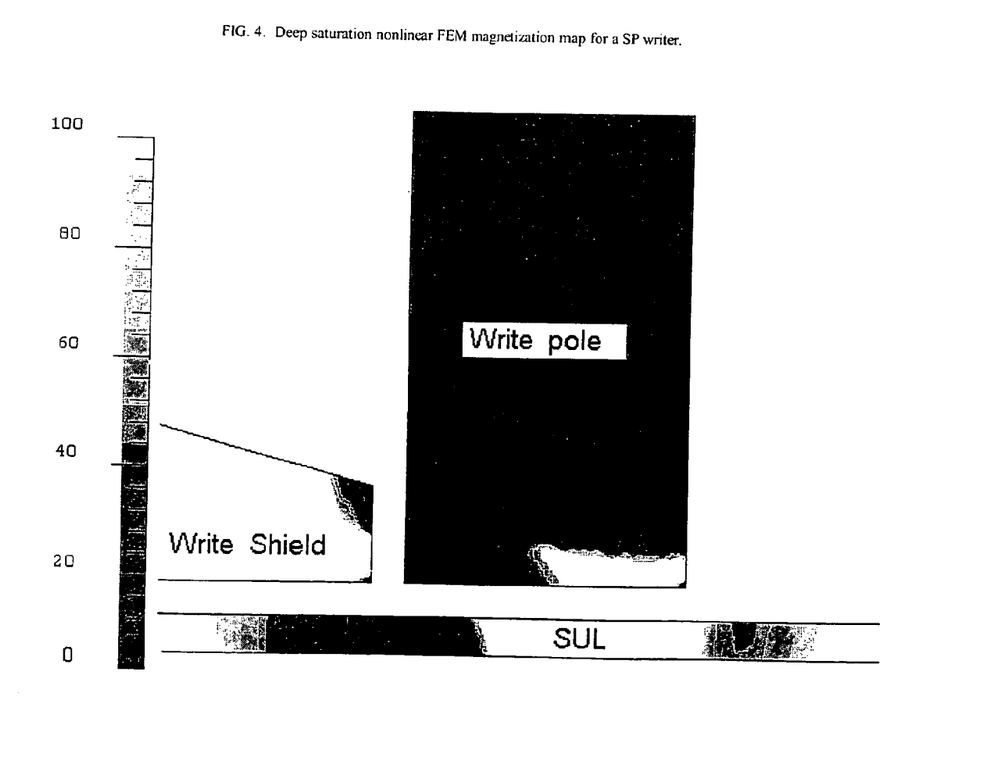
FIG. 4 is a representation of deep saturation non-linear FEM magnetic field map for a shielded pole writer.

For switching of Stoner-Wohlfarth particles, oriented in the perpendicular direction (z), by coherent rotation the effective write field is given by:

$$H_{eff} = [(H_x^2 + H_y^2)^{1/3} + H_z^{2/3}]^{3/2} \quad (4)$$

where x and y are the down track and crosstrack directions, respectively. Equation (4) is the three-dimensional version of the effective switching field equation discussed above for the case of a two-dimensional analysis. The particle switches when this effective switching field exceeds the anisotropy field, $H_K$. The down stream shield of the SP writer not only increases the gradient of $H_z$ but it also provides almost twice as much $H_x$. This lowers the amount of $H_z$ that is required for switching. When the SUL is driven into saturation, the loss of $H_z$ is mostly offset by the increase in $H_x$ that results partly from a portion of the write pole flux propagating horizontally to the down stream shield through the recording layer and partly from a portion of the SUL flux propagating across the saturation zone through the recording layer. An example of this is shown in FIG. 4, which shows the FEM results for SUL saturation with a SP writer.

Figure 5:
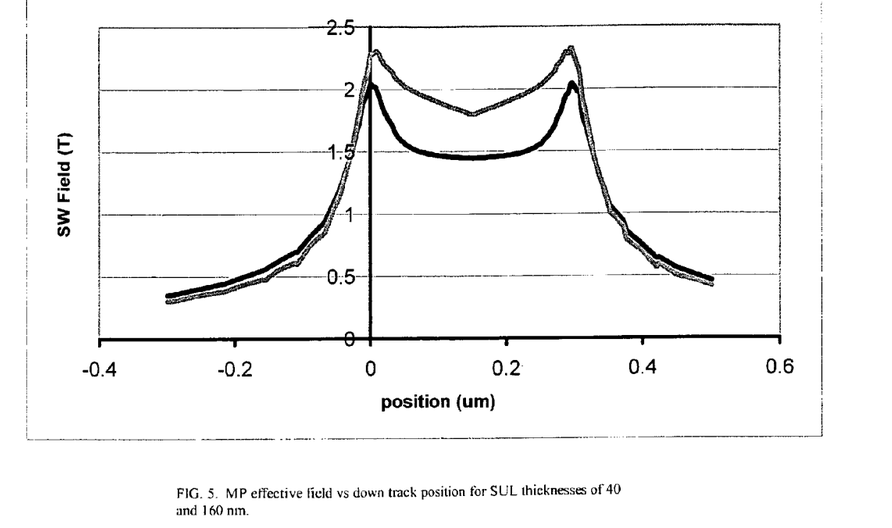
FIG. 5 is a plot of the effective field from a monopole writer versus downtrack position with SUL thicknesses of 40 nm and 160 nm.
Figure 6:
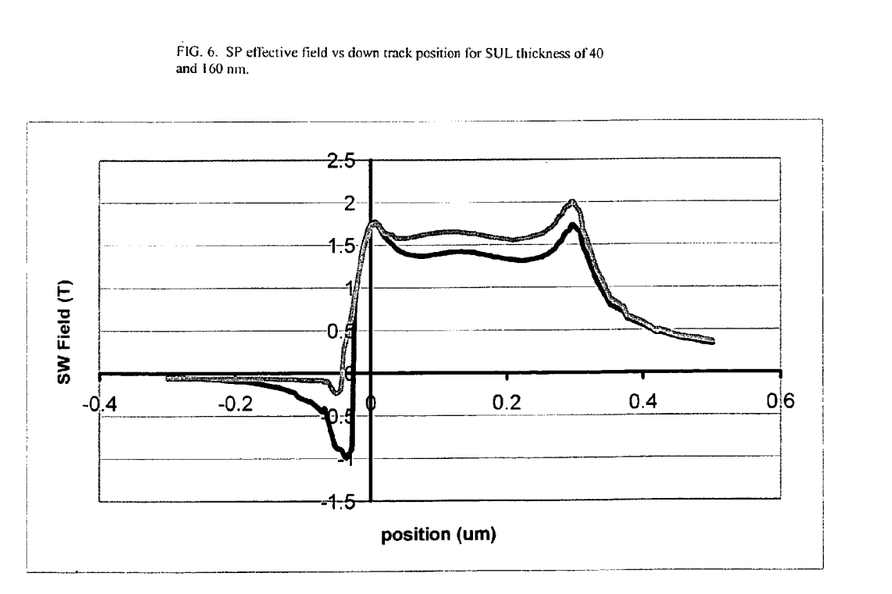
FIG. 6 is a plot of the effective field from a shielded pole writer versus downtrack position with SUL thicknesses of 40 nm and 160 nm.
Figure 7:
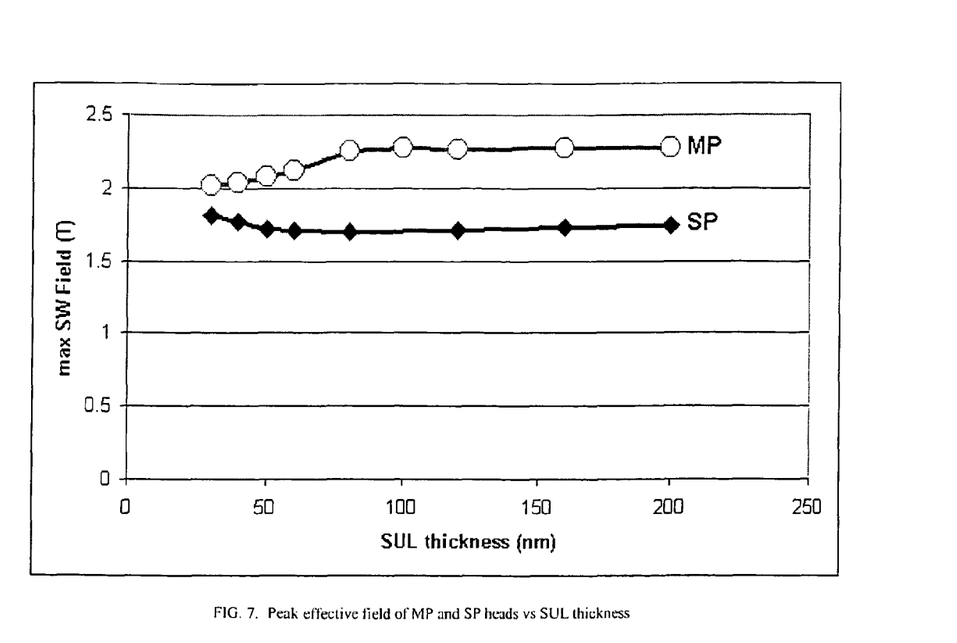
FIG. 7 is a plot of the peak effective field versus SUL thickness for monopole and shielded pole writers.

The FEM calculations reported here were performed with the parameters listed in Table I below for both the MP and SP writers. These parameters were chosen to be the representatives of the geometries of current interest. The need for a deep saturation analysis arises from the necessity of using overshoot to get adequate switching speed, as previously theoretically identified by Takano for a longitudinal head. For the analyses reported here the magnetomotive force was four times greater than what was necessary to cause flux-limiting saturation of the system. The calculated effective write field versus down track position for a MP writer and a SP writer is shown in FIGS. 5 and 6, respectively, for SUL thicknesses of 40 and 160 nm. The peak of the effective fields in these figures versus the SUL thickness is plotted in FIG. 7. From this figure it can be seen that the MP head loses more that 5% of its effective field for a SUL thickness less than 65 nm. On the other hand, the SP head slightly increases the effective field down stream of the pole as the SUL is thinned. However, the sag in perpendicular field directly under the pole (see FIG. 5) is expected to result in some loss of overwrite. This result is qualitatively confirmed for the SP head by the overwrite measurements reported below. Though the effective write field does not place a lower limit on the SUL thickness for the SP head, the negative excursion of the effective field under the shield does. In FIG. 5, the 40-nm SUL results in a 1 Tesla field, which would corrupt on-track data if the dynamic coercivity was too low.

TABLE I

| FEM analysis parameters | |
|---|---|
| Pole length | 300 nm |
| Pole width | 150 nm |
| Neck height | 100 nm |
| Spacing | 10 nm |
| Media thickness | 15 nm |
| Interlayer thickness | 10 nm |
| SP gap | 35 nm |
| SP throat height | 100 nm |
| $M_s$ pole | 2.4 T |
| $M_s$ SUL | 1.5 T |
| $M_s$ Down stream shield | 2.4 T |
| Current * Turns | 0.2 A |

Figure 8:
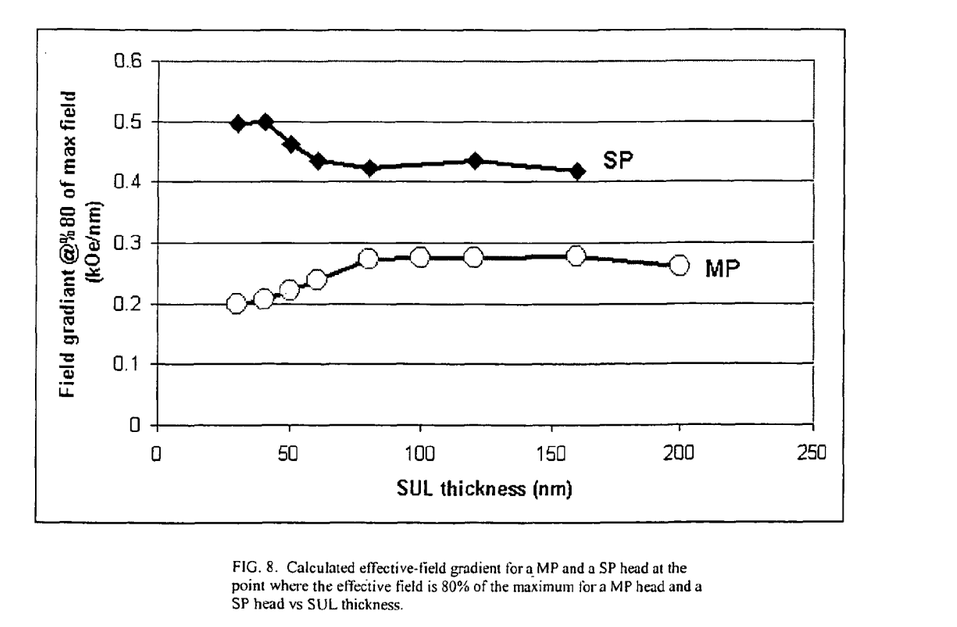
FIG. 8 is a plot of the calculated effective field gradient versus SUL thickness for monopole and shielded pole writers, calculated at the point where the effective field is 80% of the maximum.

In addition to increasing the effective write field for thin SULs, the SP head also increases the write field gradient. FIG. 8 shows the calculated gradient in the effective write field for the MP head and the SP versus the SUL thickness. The gradient is calculated at a position where the effective field is 80% of its maximum value so that the gradient is approximately maximal. From this figure it can be seen that the MP gradient degrades by 5% for a SUL thicknesses less than 73 nm while the SP head increases its gradient by 20% for a SUL thickness of 400 nm. This should result in a 1.6 dB improvement in media SNR.

Figure 9:
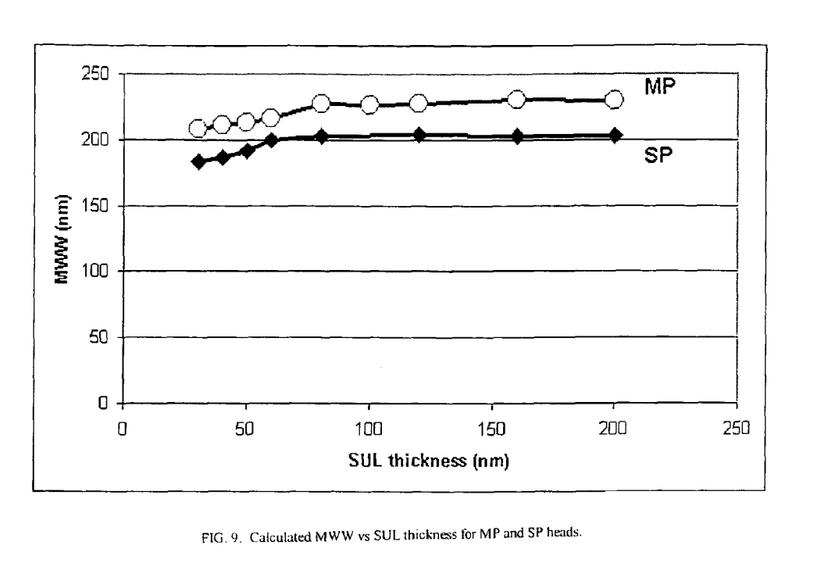
FIG. 9 is a plot of calculated MWW versus SUL thickness for monopole and shielded pole writers.

In the off-track direction the position where the effective field falls below 50% of its maximum value for a thick SUL (unsaturated) decreases for the MP and SP heads as the SUL is thinned. For all the SUL thicknesses, the MWW for the SP head is about 10% less than that of the MP head. This is shown in FIG. 9.

Figure 10:
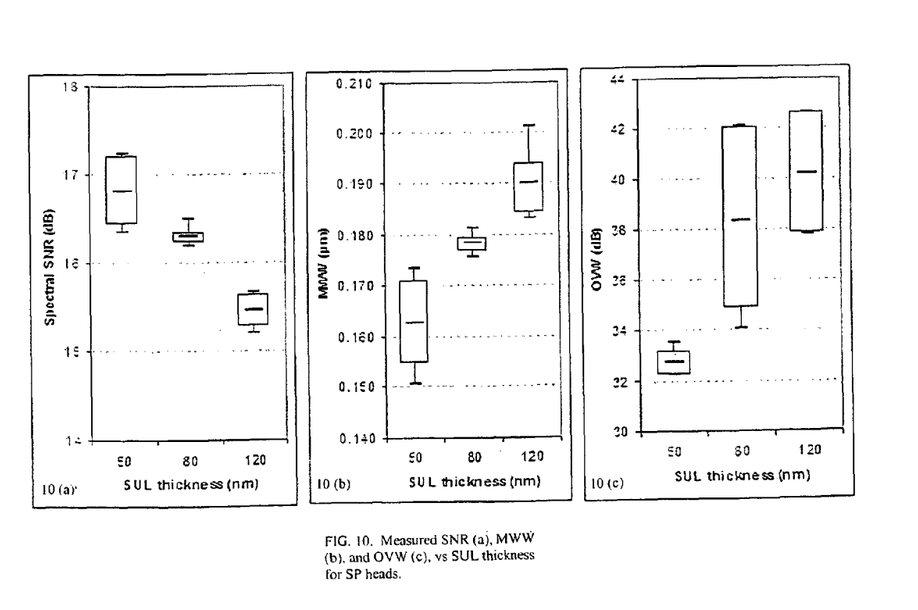
FIGS. 10a, 10b, and 10c are plots of measured SNR, MWW, and OWW versus SUL thickness for monopole and shielded pole writers.

We have experimentally verified these calculated trends in SNR (i.e., field gradient), MWW, and overwrite (i.e., field strength) versus SUL thickness for SP heads. Data for two heads on two sets of disks with three SUL thicknesses (50, 80, and 120 nm) was taken. The results are shown in FIG. 10. The MWW decreases significantly with the SUL thickness while the loss in overwrite is moderate for the 80-nm SUL and significant for the 50-nm SUL. The SNR actually improves by 1.4 dB as the SUL is thinned.

The use of the SP writer design allows for much thinner SULs than that of the MP design. The MP design achieves best recording performance on SULs that are thick enough not to saturate during the write process. On the other hand, the SP design achieves optimum performance on SULs that are thin enough to saturate moderately (SNR and MWW) but not so thin that overwrite is excessively degraded or the negative field under the shield results in degradation of on-track data.

It can be appreciated that using relatively thin SULs with shielded pole writers avoids the additional expense of thick SULs (e.g., $1 per disk), reduces the write fringing field (allowing for higher track density), makes the SUL less susceptible to stray fields and inadvertent erasure, reduces wide-area track erasure (WATER) effects, and provides other advantages as well. Further, SULs thinner than conventional 200-nm thicknesses can be used; they can be less that 120 nm, less than 100 nm, and can be at least as thin as 50 nm or less and still have good performance characteristics.

The foregoing description of the present invention has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

What is claimed is:

1. A system comprising:
    a write element for producing a write field, the write element having a write pole and a downstream write shield, the write pole having an area and a perimeter at an air bearing surface; and
    a magnetic medium facing the write element at the air bearing surface, the magnetic medium comprising:
    an upper layer having perpendicular anisotropy for recording data; and
    a lower layer for returning flux from the write pole to the downstream write shield;
    wherein a thickness of the lower layer is less than a ratio of the area of the write pole to the perimeter of the write pole times a ratio of a saturation magnetization of the write pole to a saturation magnetization of the lower layer, such that the lower layer is driven into saturation by the write field in a vicinity nearest the write pole; and wherein the write pole comprises a write pole tip facing the magnetic medium at the air bearing surface, and wherein a distance from the write pole to the lower layer is between half and twice a distance from the write pole tip to the downstream write shield.

2. The system of claim 1, wherein a portion of the flux from the write pole propagates longitudinally through the upper layer to the downstream write shield.

3. The system of claim 2, wherein a portion of flux from the lower layer propagates across a saturation zone through the upper layer.

4. The system of claim 3, wherein the portions of flux propagating through the upper layer offset a loss in a perpendicular component of an effective switching field when the lower layer is driven into saturation by the write field, such that the effective switching field exceeds an anisotropy field in the upper layer.

5. The system of claim 1, wherein the write element generates greater magnetomotive force than necessary to cause flux-limiting saturation of the lower layer.

6. The system of claim 1, wherein the thickness of the lower layer is greater than 50% of the ratio of the area to the perimeter of the write pole times the ratio of saturation magnetizations of the write pole and the lower layer.

7. The system of claim 6, wherein the thickness of the lower layer is less than 81.5% of the ratio of the area to the perimeter of the write pole times the ratio of saturation magnetizations of the write pole and the lower layer.

8. The system of claim 5, wherein the magnetomotive force is four times greater than necessary to cause flux-limiting saturation of the lower layer in the vicinity nearest the write pole.

9. A magnetic disk system comprising:
    a write transducer having a write pole and a downstream write shield, the write pole having an area and a perimeter at an air bearing surface; and a magnetic disk comprising: a recording layer facing the write pole at the air bearing surface, the recording layer having perpendicular anisotropy; and a soft underlayer on an opposite side of recording layer from the write pole
    the soft underlayer having low magnetic reluctance-for returning flux from the write pole to the downstream write shield;
    wherein a thickness of the soft underlayer is less than a ratio of the area of the write pole to the perimeter of the write pole times a ratio of a saturation magnetization of the write pole to a saturation magnetization of the soft underlayer, such that the write transducer generates greater magnetomotive force than necessary to drive the soft underlayer into saturation in a vicinity nearest the write pole, wherein the thickness of the soft underlayer is less than 65 nm.

10. The magnetic disk system of claim 9, wherein the write pole comprises a write pole tip facing the magnetic medium at the air bearing surface, and wherein a distance from the write pole to the soft underlayer is between half and twice a distance from the write pole tip to the downstream write shield.

11. The magnetic disk system of claim 10, wherein a portion of the flux from the write pole propagates longitudinally through the recording layer to the downstream write shield and a portion of flux from the soft underlayer propagates across a saturation zone through the recording layer.

12. The magnetic disk system of claim 11, wherein the portions of flux that propagate through the recording layer offset a loss in a perpendicular component of an effective switching field when the soft underlayer is driven into saturation, such that magnetic domains in the recording layer switch from one perpendicular orientation to another perpendicular orientation.

13. The magnetic disk system of claim 9, wherein the thickness of the soft underlayer is greater than 40 nm, such that a negative excursion of an effective field under the downstream write shield does not corrupt on-track data.

14. A disk drive for reading and writing data, the disk drive comprising:
    a read/write head comprising: a write pole for writing the data, the write pole having an area and a perimeter at an air bearing surface; a downstream write shield; and a magnetoresistive read element for reading the data; and a magnetic disk facing the read/write head at the air bearing surface, the magnetic disk comprising: a recording layer having perpendicular anisotropy for recording the data; and a soft underlayer disposed under the recording layer, such that the recording layer is closer to the read/write head than the soft underlayer; wherein a thickness of the soft underlayer is less than a ratio of the area of the write pole to the perimeter of the write pole times a ratio of a saturation magnetization of the write pole to a saturation magnetization of the soft underlayer, such that the soft underlayer is driven into saturation in a vicinity nearest the write pole when the write pole writes the data, wherein the thickness of the soft underlayer is less than 65 nm.

15. The disk drive of claim 14, wherein the write pole comprises a write pole tip facing the magnetic medium at the air bearing surface, and wherein a distance from the write pole to the soft underlayer is between half and twice a distance from the write pole tip to the downstream write shield, such that flux propagates longitudinally through the recording layer to the downstream write shield.

16. The disk drive of claim 15, wherein the flux that propagates longitudinally through the recording layer to the downstream write shield offsets a loss in a horizontal field component when the soft underlayer is driven into saturation, such that an effective switching field exceeds an anisotropy field in the recording layer and magnetic domains in the recording layer switch from one perpendicular orientation to another perpendicular orientation.

17. The disk drive of claim 16, wherein the thickness of the soft underlayer is greater than half the ratio of the area to the perimeter of the write pole times the ratio of saturation magnetizations of the write pole and the soft underlayer.

* * * * *